(12) United States Patent
Langlois et al.

(10) Patent No.: US 8,914,451 B2
(45) Date of Patent: Dec. 16, 2014

(54) ELECTRONIC DEVICE CONFIGURED WITH MESSAGING COMPOSITION INTERFACE

(75) Inventors: Michael George Langlois, Almonte (CA); Robert Simon Lessing, Malmö (SE)

(73) Assignee: Blackberry Limited, Waterloo (CA)

( * ) Notice: Subject to any disclaimer, the term of this patent is extended or adjusted under 35 U.S.C. 154(b) by 0 days.

(21) Appl. No.: 13/400,018

(22) Filed: Feb. 17, 2012

(65) Prior Publication Data

US 2013/0218984 A1 Aug. 22, 2013
US 2014/0047037 A2 Feb. 13, 2014

(51) Int. Cl.
*G06F 15/16* (2006.01)
*H04L 12/58* (2006.01)

(52) U.S. Cl.
CPC ............... *H04L 51/04* (2013.01); *H04L 51/32* (2013.01); *H04L 12/58* (2013.01); *H04L 51/36* (2013.01)
USPC .......................................... 709/206; 709/207

(58) Field of Classification Search
CPC ....... H04L 51/36; H04L 12/589; H04L 51/04; H04L 12/58; H04L 51/00; H04L 12/588; H04L 51/32
USPC ........... 709/204–207; 705/319; 715/733, 738, 715/739, 744–747, 751–753
See application file for complete search history.

(56) References Cited

U.S. PATENT DOCUMENTS

| | | | |
|---|---|---|---|
| 7,765,263 B1 * | 7/2010 | Alfke | 709/206 |
| 7,836,136 B1 * | 11/2010 | Alfke | 709/206 |
| 2004/0017396 A1 * | 1/2004 | Werndorfer et al. | 345/751 |
| 2004/0024822 A1 * | 2/2004 | Werndorfer et al. | 709/206 |
| 2005/0251555 A1 * | 11/2005 | Little, II | 709/206 |
| 2006/0085515 A1 * | 4/2006 | Kurtz et al. | 709/207 |
| 2007/0116195 A1 | 5/2007 | Thompson et al. | |
| 2007/0299924 A1 * | 12/2007 | Tremblay | 709/206 |
| 2008/0021970 A1 * | 1/2008 | Werndorfer et al. | 709/206 |
| 2008/0222256 A1 * | 9/2008 | Rosenberg et al. | 709/206 |
| 2009/0083709 A1 | 3/2009 | Millett et al. | |
| 2010/0167766 A1 * | 7/2010 | Duarte et al. | 455/466 |
| 2010/0217809 A1 * | 8/2010 | Vymenets et al. | 709/206 |
| 2010/0235759 A1 * | 9/2010 | Kang et al. | 715/752 |
| 2011/0029892 A1 * | 2/2011 | Kurtz et al. | 715/752 |
| 2011/0029923 A1 * | 2/2011 | Xu et al. | 715/825 |

(Continued)

FOREIGN PATENT DOCUMENTS

| | | |
|---|---|---|
| EP | 1802056 A1 | 6/2007 |
| EP | 2045985 A1 | 4/2009 |
| WO | 2008103855 A1 | 8/2008 |

OTHER PUBLICATIONS

Extended European Search report mailed May 7, 2013, in corresponding European patent application No. 12190743.0.

*Primary Examiner* — Patrice Winder
*Assistant Examiner* — Julian Chang
(74) *Attorney, Agent, or Firm* — Novak Druce Connolly Bove + Quigg LLP

(57) ABSTRACT

An electronic device and method for sending a message is provided. The electronic device includes a network interface, an input device and a processor in communication with the network interface and the input device. The processor is configured to establish a connection with a plurality of messaging applications, select a messaging service, receive content and input via a messaging composition interface and send the message. The method involves establishing a connection with a plurality of messaging applications, selecting a messaging service, receiving content and input via a messaging composition interface, and sending the message.

20 Claims, 11 Drawing Sheets

(56) References Cited

U.S. PATENT DOCUMENTS

| | | | |
|---|---|---|---|
| 2011/0060804 A1* | 3/2011 | Alfke | 709/206 |
| 2011/0083079 A1* | 4/2011 | Farrell et al. | 715/739 |
| 2011/0106889 A1 | 5/2011 | Scott et al. | |
| 2011/0214083 A1* | 9/2011 | Kang et al. | 715/780 |
| 2012/0124483 A1* | 5/2012 | Zuckerberg et al. | 715/752 |
| 2012/0210253 A1* | 8/2012 | Luna et al. | 715/753 |
| 2012/0260188 A1* | 10/2012 | Park et al. | 715/739 |
| 2013/0073636 A1* | 3/2013 | Zhu et al. | 709/206 |

* cited by examiner

140

| Cancel | New Message |

Desktop  
marc@work.com   160-1  ▼

Twitter  
@marc   160-2

Facebook  
Marc   160-3

SMS/MMS  
(555) 555-5555   160-4

BBM  
marcD   160-5

Gmail  
marc@gmail.com   160-6

148 →

Desktop  
marc@work.com   160-1

To:   ➕

Cc:   ➕

Back   Attach   Spelling   Importance 170-5

170-6

170-7

170-8

170-9

170-10

170-11

170-12

ELECTRONIC DEVICE CONFIGURED WITH MESSAGING COMPOSITION INTERFACE

FIELD

The present specification relates generally to computing devices and more specifically relates to an electronic device configured with a messaging interface.

BACKGROUND

With the proliferation of portable electronic devices, there has been accompanying growth in messaging applications. Far beyond traditional email and short messaging service (SMS), there are now a plethora of instant messaging applications, as well as a plethora of messaging platforms entirely internal to accounts maintained within major social networking sites such as Facebook™, Twitter™ and Google+™.

DETAILED DESCRIPTION OF THE EMBODIMENTS

Figure 1:
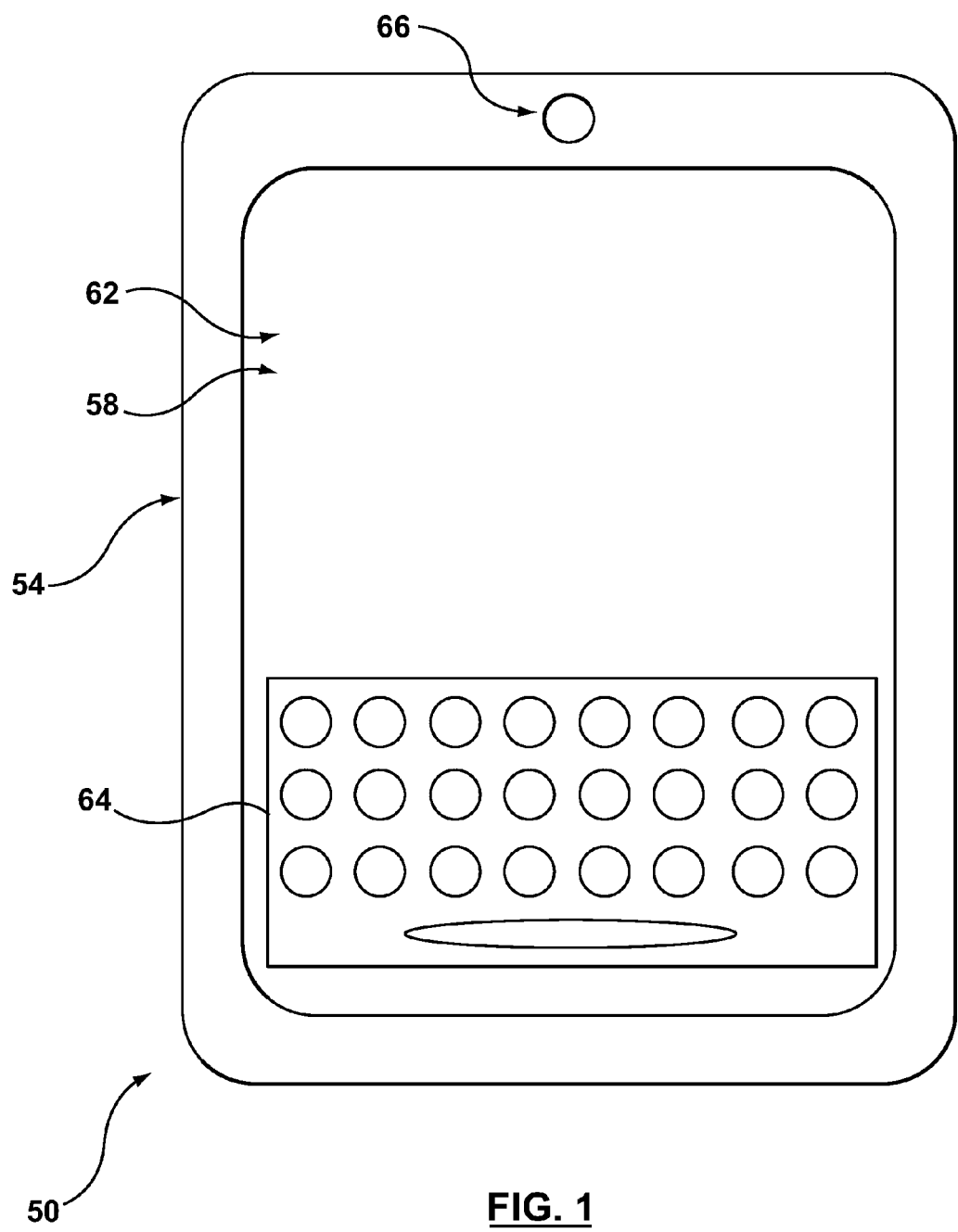
FIG. 1 is a schematic representation of a front view of an exemplary portable electronic device.

An aspect of this specification provides an electronic device configured with a graphical interface for composing, sending and optionally receiving any one of a plurality of communication types via associated messaging services, such as, without limitation, Email, Instant Messaging, Short Message Service (SMS), Multi-media Messaging Service (MMS), social network messaging environments such as Facebook, Twitter, Foursquare, and other related types communications. Composition through the graphical interface does not require that invocation of the application associated with the relevant communication type. In certain aspects, the composition interface connects with messaging services via an exposed application programming interface. The graphical interface can be configured to provide the ability to specify message type at any point prior to sending, or before or after composition begins. The ability to add, remove, or modify different communication fields can be dynamically provided according to the selected communication types. The content carried via the graphical interface can comprise one or more of music, audio, video or text. As used herein, the term messaging is to be construed in a non-limiting sense, and can include, for examples, status updates, emails, instant messages and audio files.

In accordance with an aspect of the specification, there is provided a method for sending a message on an electronic device. The method comprises establishing a connection with a plurality of messaging applications. The method further comprises selecting a messaging service, wherein the messaging service is associated with a messaging application of the plurality of messaging applications. The method also comprises receiving content, via a messaging composition interface, wherein the message comprises the content. In addition, the method comprises receiving input indicative of an addressee, via the messaging composition interface. Furthermore, the method comprises sending the message to the addressee via the selected service.

In accordance with another aspect of the specification, there is provided a method for sending a message on an electronic device. The method comprises receiving, at a message composition interface, an input corresponding to a selection of a messaging service, the selection from a plurality of messaging services. The method further comprises receiving content, at a messaging composition interface, wherein the message comprises the content. In addition, the method comprise receiving input indicative of addressee destination for the message at the messaging composition interface. Also, the method comprises sending the message to the destination via the selected service.

The method can further comprising rendering a menu comprising a plurality of selections corresponding to the plurality of message applications.

Selecting the message service can comprise receiving input corresponding to a selection from the plurality of selections.

The method can further comprise adjusting the messaging composition interface to conform with the messaging service Selecting a messaging service can comprise determining a subset of available messaging services available to the addressee.

The method can further comprise rendering a menu comprising a plurality of selections corresponding to the subset of available messaging services.

Receiving an addressee can comprise populating a recipient field of the messaging composition interface.

The method can further comprise recommending a recipient based on a portion of the input.

In accordance with another aspect of the specification, there is provided an electronic device for sending a message. The electronic device includes a network interface for communicating over a network. The electronic device also includes an input device. Furthermore, the electronic device includes a processor in communication with the network interface and the input device. The processor is configured to establish a connection with a plurality of messaging applications. The processor is further configured to select a messaging service, wherein the messaging service is associated with a messaging application of the plurality of messaging applications. Furthermore, the processor is configured to receive content from the input device, via a messaging composition interface, wherein the message comprises the content. In addition, the processor is configured to receive input indicative of an addressee, via the messaging composition interface. Also, the processor is configured to send the message to the addressee via the selected service through the network.

The electronic device can further include a display in communication with the processor, wherein the processor can be further configured to render a menu comprising a plurality of selections corresponding to the plurality of message applications on the display.

The input device can be configured to receive input corresponding to a selection from the plurality of selections.

The processor can be further configured to adjust the messaging composition interface to conform with the messaging service.

The processor can be further configured to determine a subset of available messaging services available to the addressee.

The electronic device can further include a display in communication with the processor, wherein the processor can be further configured to render a menu comprising a plurality of selections corresponding to subset of available messaging services on the display.

The input device can be configured to receive input for populating a recipient field of the messaging composition interface.

The input device can be a touch membrane.

In accordance with yet another aspect of the specification, there is provided a non-transitory computer readable storage medium encoded with codes. The codes are for directing a processor to establish a connection with a plurality of messaging applications. Furthermore, the codes are for directing a processor to select a messaging service, wherein the messaging service is associated with a messaging application of the plurality of messaging applications. In addition, the codes are for directing a processor to receive content, via a messaging composition interface, wherein the message comprises the content. The codes are also for directing a processor to receive input indicative of an addressee, via the messaging composition interface. Furthermore, the codes are for directing a processor to send the message to the addressee via the selected service.

FIG. 1 is a schematic representation of a non-limiting example of a portable electronic device 50 which can be used for social media communications with similar devices, as discussed in greater detail below. It is to be understood that portable electronic device 50 is an example, and it will be apparent to those skilled in the art that a variety of different portable electronic device structures are contemplated. Indeed variations on portable electronic device 50 can include, without limitation, a cellular telephone, a portable email paging device, a camera, a portable music player, a portable video player, a personal digital assistant, a portable book reader, a portable video game player, a tablet computer, a netbook computer, or a laptop computer. Other contemplated variations include devices which are not necessarily portable, such as desktop computers.

Referring to FIG. 1, device 50 comprises a chassis 54 that supports a display 58. Display 58 can comprise one or more light emitters such as an array of light emitting diodes (LED), liquid crystals, plasma cells, or organic light emitting diodes (OLED). Other types of light emitters are contemplated. A touch membrane 62 is overlaid on display 58 to thereby provide an input device for device 50. As a non-limiting example, device 50 can be configured to selectively show or hide a virtual keyboard 64. Other types of input devices, other than touch membrane 62, or in addition to touch membrane 62, are contemplated. For example, a physical keyboard, or touch-pad, or joystick or trackball or track-wheel, a microphone, or optical camera or any one or more of them can be provided, in addition to or in lieu of touch membrane 62. Such other components may, if desired, be "slide-out" components. In a present implementation, device 50 also comprises a speaker 66 for generating audio output, but speaker 66 is optional.

Figure 2:
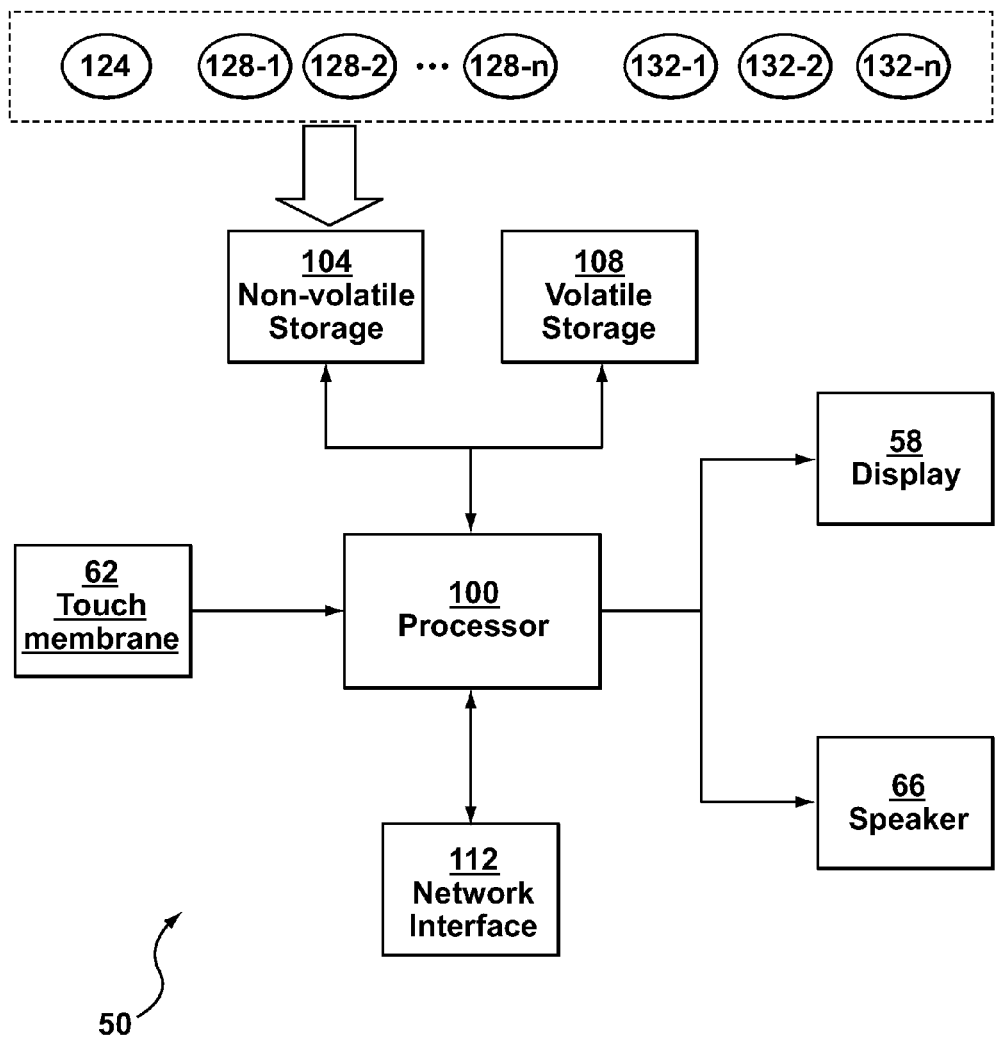
FIG. 2 is a block diagram of the electronic components of the device shown in FIG. 1.

FIG. 2 shows a schematic block diagram of the electronic components of device 50. It should be emphasized that the structure in FIG. 2 is a non-limiting example. Device 50 includes at least one input device which in a present embodiment includes touch membrane 62. As noted above, other input devices are contemplated. Input from touch membrane 62 is received at a processor 100. In variations, processor 100 may be implemented as a plurality of processors. Processor 100 can be configured to execute different programming instructions that can be responsive to the input received via the one or more input devices. To fulfill its programming functions, processor 100 is also configured to communicate with at least one non-volatile storage unit 104 (e.g., Erasable Electronic Programmable Read Only Memory ("EEPROM"), Flash Memory) and at least one volatile storage unit 108 (e.g. random access memory ("RAM")). Programming instructions that implement the functional teachings of device 50 as described herein are typically maintained, persistently, in non-volatile storage unit 104 and used by processor 100 which makes appropriate utilization of volatile storage 108 during the execution of such programming instructions.

Processor 100 in turn is also configured to control display 58 and speaker 66 and any other output devices that may be provided in device 50, also in accordance with different programming instructions and responsive to different input receive from the input devices.

Processor 100 also connects to a network interface 112, which can be implemented in a present embodiment as a radio configured to communicate over a wireless link, although in variants device 50 can also include a network interface for communicating over a wired link. Network interface 112 can thus be generalized as a further input/output device that can be utilized by processor 100 to fulfill various programming instructions which involve communicating over a network via the link. It will be understood that interface 112 is configured to correspond with the network architecture that defines such a link. Present, commonly employed network architectures for such a link include, but are not limited to, Global System for Mobile communication ("GSM"), General Packet Relay Service ("GPRS"), Enhanced Data Rates for GSM Evolution ("EDGE"), 3G, High Speed Packet Access ("HSPA"), Code Division Multiple Access ("CDMA"), Evolution-Data Optimized ("EVDO"), Institute of Electrical and Electronic Engineers ("IEEE") standard 802.11, Bluetooth™ or any of their variants or successors. It is also contemplated each network interface 112 can include multiple radios to accommodate the different protocols that may be used to simultaneously or individually communicate over different types of links.

As will become apparent further below, device 50 can be implemented with different configurations than described, omitting certain input devices or including extra input devices, and likewise omitting certain output devices or including extra input devices.

In a present embodiment, device 50 is also configured to maintain, within non-volatile storage 104, a messaging composition interface ("MCI") application 124 and one or more messaging applications 128-1, 128-2 . . . 128-n. (Collectively these are referred to as messaging applications 128, and generically each are referred to as messaging application 128. This nomenclature is used elsewhere herein.) While MCI application 124 contains the term "application", it is to be understood that MCI application 124 can be implemented in a variety of different types of software objects, such as, for example, a software function or a software process or a software environment. Non-volatile storage 104 may also maintain one or more additional applications 132, such as a calendar, a phone application, or any "app". Application 124, applications 128 and applications 132 can be pre-stored in non-volatile storage 104 upon manufacture of device 50, or downloaded via network interface 112 and saved on non-volatile storage 104 at any time subsequent to manufacture of device 50.

As will be explained further below, MCI application 124 can be integrated with existing messaging applications 128, such as Email, Instant Messaging, Short Message Service (SMS), and internal messaging applications within social messaging environments such as Facebook, Twitter, Foursquare, and Google+. MCI application 124 can be used to interact with other devices that are also configured to execute their own messaging applications 128, and such devices can include their own instance of MCI application 124.

Processor 100 is configured to execute MCI application 124, messaging applications 128 and other applications 132, accessing non-volatile storage 104 and volatile storage 108 as needed.

Figure 3:
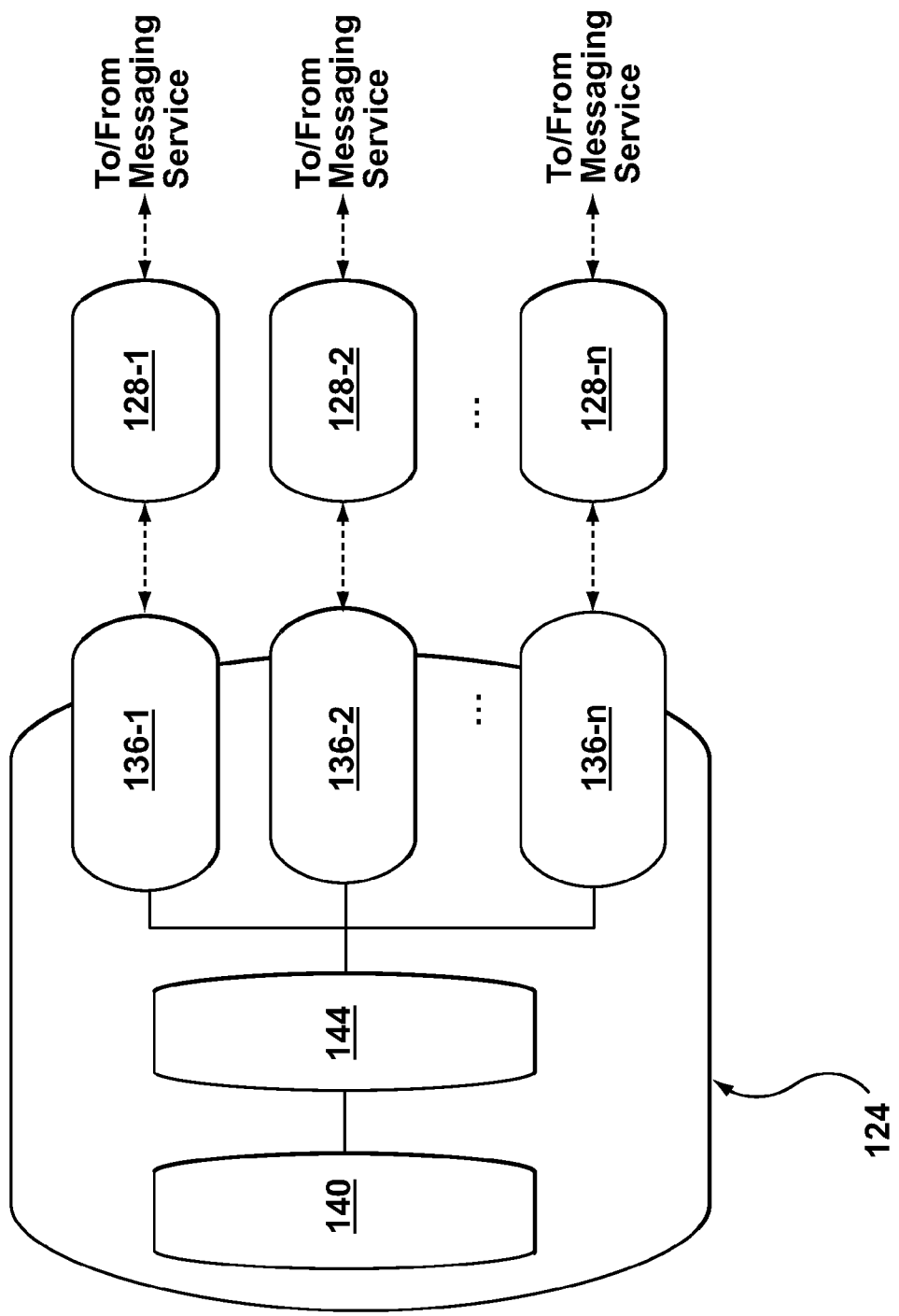
FIG. 3 is a block diagram of a messaging composition interface connected with messaging applications.

A plurality of ways to implement MCI application 124 is contemplated. Referring now to FIG. 3, however, an example configuration for MCI application 124 and messaging applications 124, during execution on processor 100, are shown in greater detail. MCI application 124 comprises a graphical engine 140, a processing engine 144 and a plurality of programming interfaces 136. Graphical engine 140 comprises programming instructions for controlling display 58 and for receiving input from touch membrane 62. Processing engine 144 comprises, amongst other things, an intermediation layer between graphical engine 140 and programming interfaces 136. Graphical engine 140 therefore operates under the control of processing engine 136 and is generally agnostic to the particular messaging applications 128 that can connect to MCI application 124. Programming interfaces 136 are each configured to communicate with processing engine 144 and messaging applications 128. Each programming interface 136 is uniquely configured, on the one hand, to communicate with each unique messaging application 128, and on the other hand each programming interface 136 is commonly configured to communicate with processing engine 144. It is contemplated that an integrated development environment (or other programming tool) or for device 50 can include a development tool for creating additional programming interfaces 136, such that as new messaging services are conceived, and as new messaging applications 128 corresponding to those new messaging services are deployed, then MCI application 124 can remain the basis for the common graphical interface on device 50.

In one implementation it is also contemplated that, because of MCI application 124, each messaging application 128 can be provided on device 50 without including its own native graphical interface for both entering messaging content and also reading messaging content, as is the current common practice. In this manner, programming resources are conserved on device 50 without sacrificing the ability to access the broadly available range of messaging services via messaging applications 128. In another implementation, one or more messaging applications 128 can be provided with its own native graphical interface, but processing and memory resources can still be conserved by not executing two or more of them in favour of using the single interface offered by MCI application 124.

Figure 4:
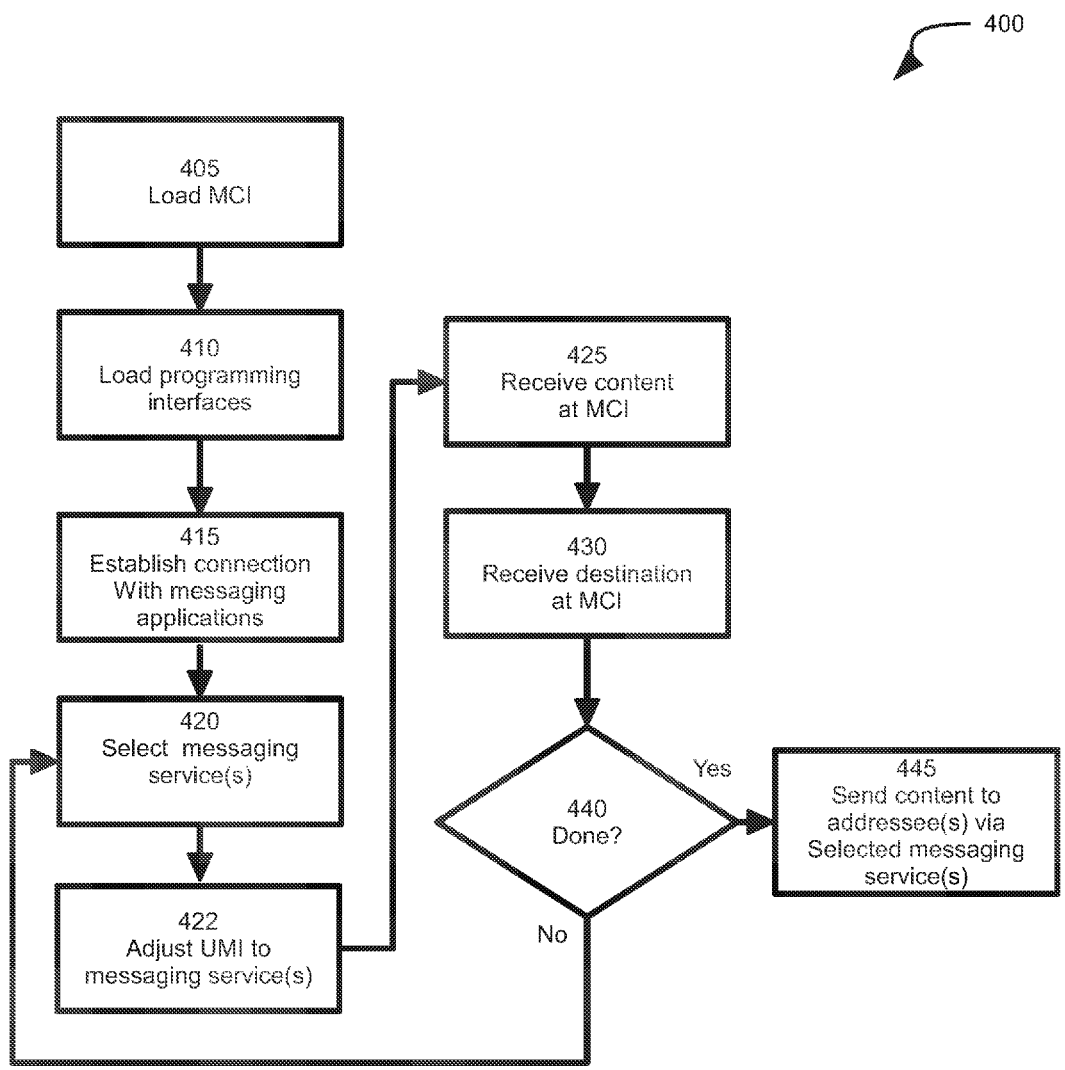
FIG. 4 is a flow chart of a method for sending a message in accordance with an embodiment.

Referring now to FIG. 4, a flowchart depicting a method for messaging on an electronic device is indicated generally at 400. Method 400 is one way in which MCI application 124 can be implemented. It is to be emphasized, however, that method 400 can be performed on variations of device 50 and MCI application 124, and need not be performed in the exact sequence as shown, hence the elements of method 400 are referred to herein as "blocks" rather than "steps".

Figure 5:
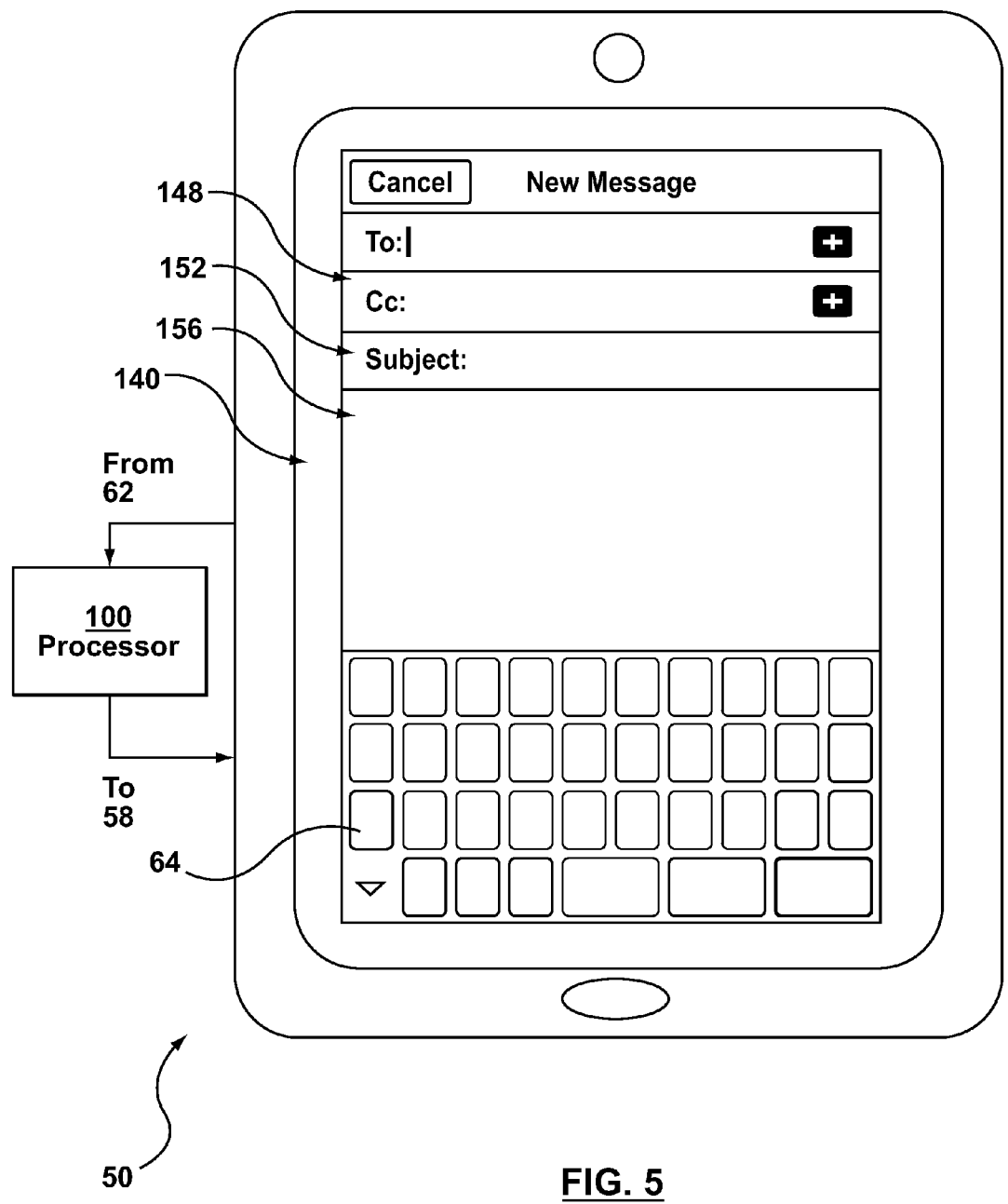
FIG. 5 is a screen capture of an exemplary portable electronic device running a messaging composition interface.

Block 405 comprises loading a messaging composition interface. Example performance of block 405 is represented in FIG. 5, wherein the graphical interface of graphical engine 140 of MCI application 124 is shown as being generated on display 58 under the control of processor 100. In the non-limiting example of FIG. 5, graphical engine 140 shows a virtual keyboard 64, a plurality of recipient fields 148, a subject field 152 and a composition field 156.

At this point it is to be highlighted that the contents of display 58 are generated under the control of processor 100. However, for convenience, in the subsequent Figures only the contents of display 58 are shown in isolation from display 58, processor 100 and device 50 in general, but it is to be understood such components are contemplated as being used to generate the contents shown in these subsequent Figures.

Block 410 thus comprises loading programming interfaces. In the context of the specific example discussed in relation to FIG. 3, block 410 contemplates loading of programming interfaces 136 into processor 100 for execution. Block 415 comprises establishing a connection with messaging applications. In the context of the specific example discussed in relation to FIG. 3, block 415 contemplates establishing a communication pathway between each programming interface 136 and its respective message application 128.

Figure 6:
FIG. 6 is a screen capture of a menu of a messaging composition interface.
Figure 6:
Figure 6:
Figure 6:
Figure 6:
Figure 6:
Figure 6:
Figure 6:
Figure 6:
Figure 6:
Figure 6:
Figure 6:
Figure 6:
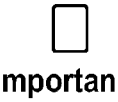
Figure 6:

As a result of performance of block 410 and block 415, processing engine 144 dynamically configures graphical engine 140 to generate a menu of choices of various messaging services associated with various message applications 128. FIG. 6 shows this example, as graphical engine 140 is shown as generating a plurality of choices of messaging services 160. The view in FIG. 6 can be achieved in a variety of ways that can be decided upon implementation of these teachings, but as a non-limiting example, a swipe gesture from the top of the screen to the bottom of the screen in the view of FIG. 5 could be used to invoke the view shown in FIG. 6. In FIG. 6, each shown messaging service 160 is associated with a particular message application 128. In the example of FIG. 6, six message services 160 are shown. Message service 160-1 is labeled "Desktop" to represent desktop email service. Message service 160-2 is labeled "Twitter" to represent a link to a Twitter account for broadcasting short text messages to followers of the Twitter account linked to message service 160-2. Facebook service 160-3 is labeled "Facebook" to represent a link to a Facebook account for broadcasting status messages to "friends" of the Facebook account linked to message service 160-3. (In a variation, Facebook service 160-3 can represent a link to the electronic mail messaging service offered within each Facebook account, whereby the Facebook account holder can use the Facebook account to send personal and unique electronic mail messages to other Facebook users). SMS/MMS service 160-4 is labeled "SMS/MMS" to represent a link to an SMS/MMS account for sending either short messages or multimedia messages via the SMS/MMS service associated with a telephone number that is typically associated with device 50. BBM™ service 160-5 is labeled "BBM" to represent a link to a BlackBerry™ Message account for sending instant messages via a BlackBerry™ service. However, it is to be understood that other types of instant message services could be provided in lieu of or in addition to the BBM service. Gmail service 160-6 is labeled "Gmail" to represent a link to a Google Email Message account for sending email messages via a email servers hosted by Google Inc. However, it is to be understood that other types of email message accounts could be provided in lieu of or in addition to the Gmail service, such as Hotmail, or Yahoo mail, or the like.

At this point it can be noted that while six example message services are shown in FIG. 6, any number of possible message services are possible, and this fact is illustrated by the use of "n" to denote message application 128-*n*. To keep with the example in FIG. 6, the example mapping in Table I will be used between services 160 and applications 128.

TABLE I

Example Message Applications and Services

| Message application | Message Service |
|---|---|
| Desktop email message application 128-1 | Desktop email service 160-1 |
| Twitter message application 128-2 | Twitter message service 160-2 |
| Facebook message application 128-3 | Facebook message service 160-3 |
| SMS/MMS message application 128-4 | SMS/MMS message service 160-4 |
| BBM Message application 128-5 | BBM Message service 160-5 |
| Gmail message application 128-6 | Gmail message service 160-6 |

Block 420 comprises selecting messaging service(s). In one implementation, a single messaging service is selected at block 420 by depressing a region of display 58 adjacent to a desired one of the messaging services 160 shown in FIG. 6.

(In other implementations of block 420, a plurality of messaging services 160 can be selected whereby received content, discussed further below, is eventually sent via one or more of the selected messaging services 160. In such other implementations, device 50 can be configured to send over all of the selected messaging services 160, or to only send to recipients that have accounts associated with the selected messaging services 160. This will be discussed in greater detail below. In other embodiments still, device 50 can be configured to determine a subset of available messaging services available to the addressee and only permit the selection of the available messaging services.)

Block 422 comprises adjusting the MCI to conform with the selected messaging services from block 420. Block 422 is optional, but can be included where the different messaging services rely on different graphical interfaces. For example, an SMS or BBM interface contemplates a chat interface with a composition frame, as well as a sent frame and a received frame. This example will be discussed further below.

Block 425 comprises receiving content via the MCI. Block 425 thus contemplates receiving text input, or the like (e.g. a voice note, or an attachment), that reflects the actual content which will be delivered to addressees that will be specified in recipients fields 148. Such text input or other content can be placed within composition field 156. Block 425 also contemplates receiving data that populates the subject field 152.

Block 430 comprises receiving input indicative of a destination for the message. In the present embodiment, the input indicative of a destination for the message is represented by an addressee. Block 430 thus contemplates populating of recipient fields 148 with addresses for intended recipients of the content received at block 425. In certain implementations, it is contemplated that block 430 contemplates an interface or other linkage between a contact management application that is also maintained on device 50. Such a linkage can be configured to only offer addressee recipients that have addresses that match the type of service selected at block 420. Alternatively, such a linkage can make all addressees available, but either prevent their selection, or if they are selected, an exception, warning, or other error message can be generated on display 58 indicating that the selected recipient has no address that matches the selected service. In still further variations, the selection of multiple recipients can lead to generation of a message that suggests which service should be selected at block 420 to maximize the number of recipients that have addresses corresponding to suggested service.

Block 440 comprises determining if all message composing is done. If "no", then method 400 returns to block 420. It is to be appreciated that if content received via the MCI from block 425 or received an addressee via the MCI from block 430, a return to block 420 will select a messaging service again. It is contemplated that the content and the addressee can be preserved or deleted. For example, if a different service is selected, block 422 (if present) can adjust the MCI. However, it is contemplated that in some embodiments, the content is preserved and re-presented in a second graphical interface. Similarly, it is also contemplated that in some embodiments, the addressee is preserved and re-presented in a second graphical interface. It is also contemplated that in some embodiments, the addresses in the recipient fields 148 can be automatically updated to correspond with the address of the addressee in the other service.

Furthermore, block 425 and block 430 can receive further content and addressees using the second graphical interface as well as allow the content and addressees to be edited. For example, an addressed message may be changed to a broadcast message. In another example, an email service composed can be changed to a status update to BBM or Facebook™, or a broadcasted tweet. In other examples, the change can be within a particular service, such as a direct BBM message can become a status update within BBM, or vice-versa.

If "yes" then at block 445 the composed message is sent through the service selected at block 420.

In certain implementations, a "yes" determination can be made at block 440 when a "send" command is received, such as by depressing a virtual button on display 58 by graphical engine 140 that is labeled "Send". Such a virtual button can be configured to be available only upon satisfaction of a validation sequence, such as to verify that selected messaging services at block 420 conform with selected recipients at block 430.

A "no" determination can be made in any instance where a "yes" determination is not satisfied at block 440. For example, a "no" determination can include receiving further input indicating that the message is not to be sent. In another example, a "no" determination can be made after the expiration of a period of time without activity.

At this point it can be emphasized that the exact sequence of blocks in method 400 is not by any means limited to the sequence shown. By way of a specific, non-limiting, example on this point, it is contemplated that inputs received at block 420, block 422, block 425 and block 430 can all be effected in any sequence during interaction with graphical engine 140. In this manner, a message can be iteratively composed to ultimately facilitate reception of a fully composed message, its recipients and desired message service. Furthermore, although the present embodiment returns to block 420 upon a "no" determination, it is also contemplated that the method can return to any one of block 420, block 422, block 425, and block 430.

Figure 7:
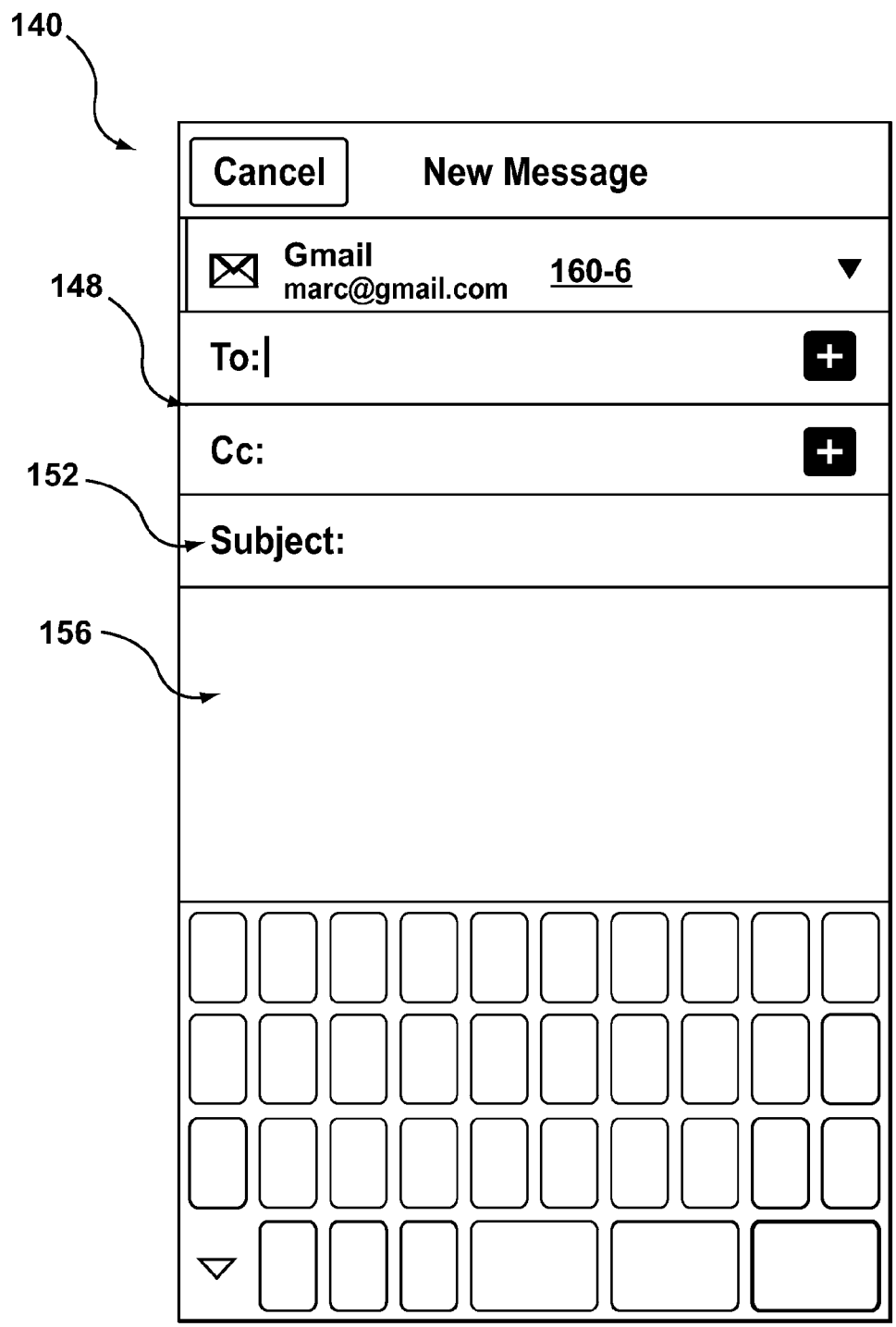
FIG. 7 is another screen capture of an exemplary portable electronic device running a messaging composition interface.
Figure 8:
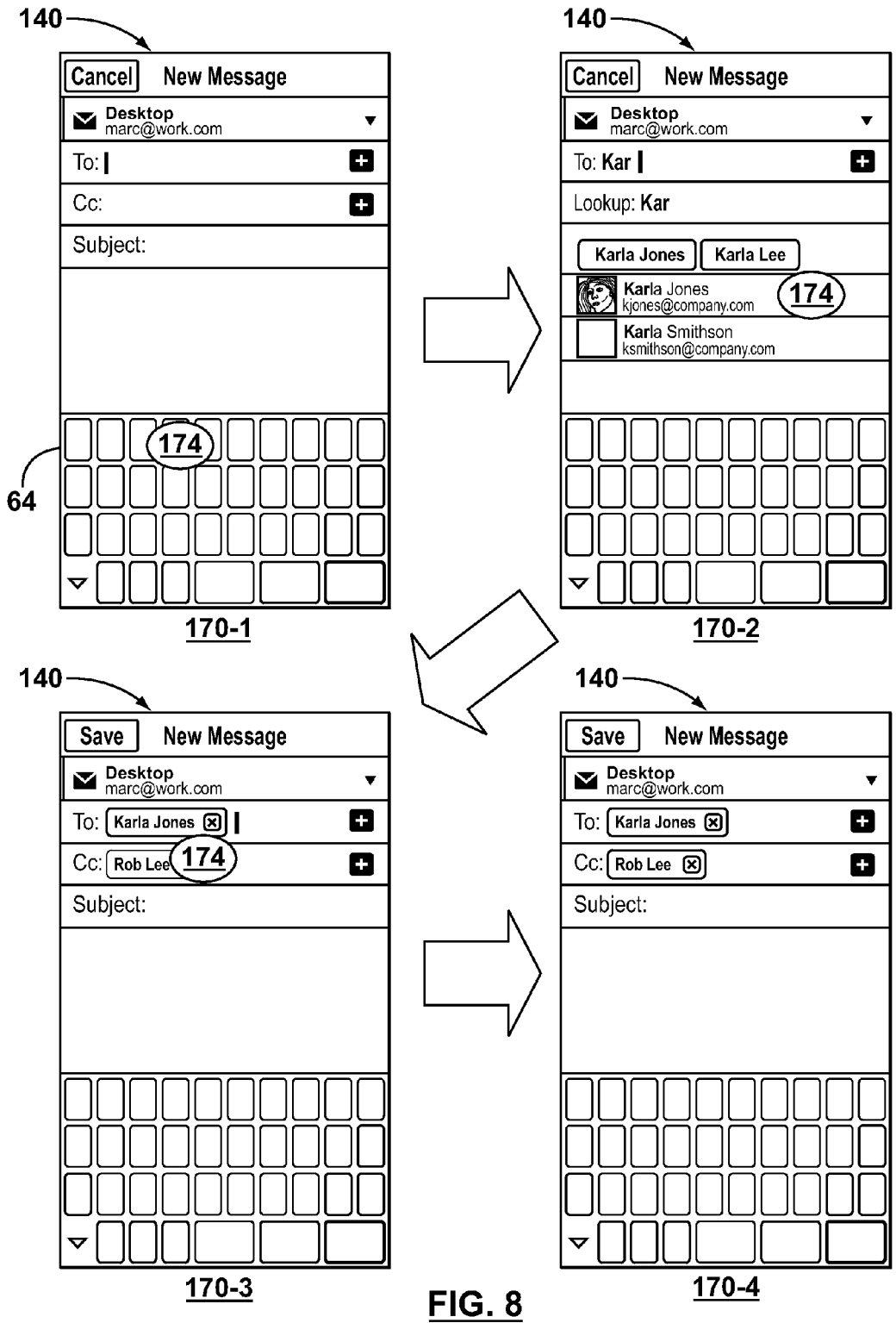
FIG. 8 is a plurality of screen captures showing an operation of a messaging composition interface.

The person skilled in the art will now recognize that method 400, device 50 and their variants can have many different implementations. For example, FIG. 8 shows an example of how block 430 can be implemented. In FIG. 8, four screens 170 are shown, in an example sequence, that can be generated by graphical engine 140 in response to input are shown. Screen 170-1 is generally analogous to the view shown in FIG. 7. Screen 170-1 also shows a screen-press 174 on virtual keyboard 64 representing entering of the text "Kar" in the recipient field representing a portion of the name of the addressee. Based on the portion of the name, the MCI can be configured to recommend possible recipients. For example, screen 170-2 shows a list of possible recipients matching the text "Kar", and a screen-press 174 beside the contact "Karla Jones". In other embodiments, the list of possible recipients can also include additional contacts based on a history of associated recipients. Screen 170-3 shows "Karla Jones" as an added recipient. Screen 170-4 shows the addition of another recipient, "Rob Lee" to illustrate that multiple recipients can be added.

Figure 9:
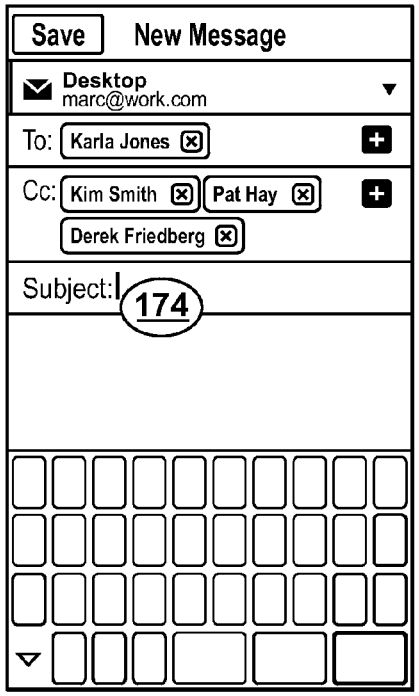
FIG. 9 is another plurality of screen captures showing another operation of a messaging composition interface.
Figure 9:
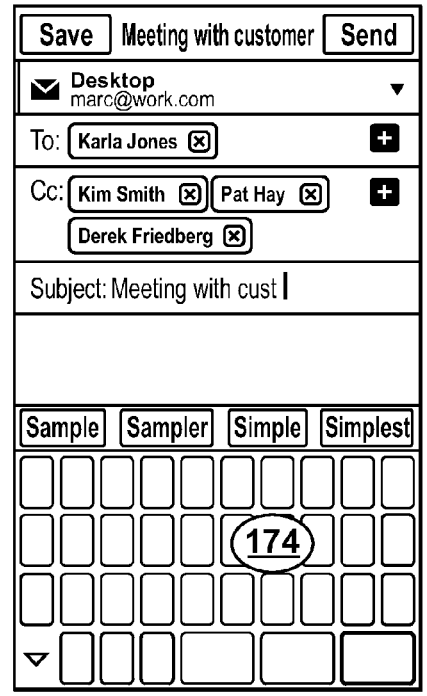
Figure 9:
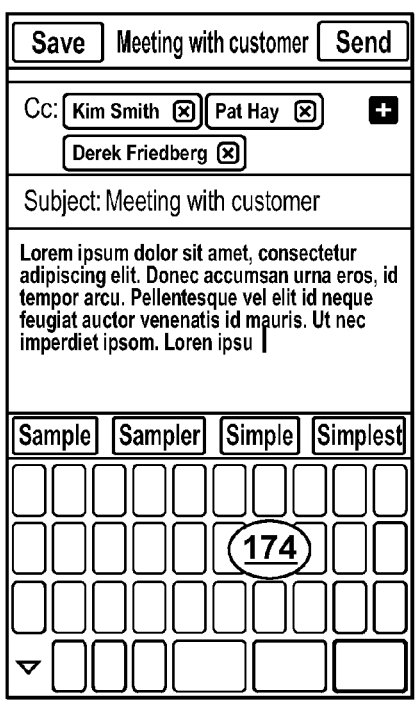
Figure 9:
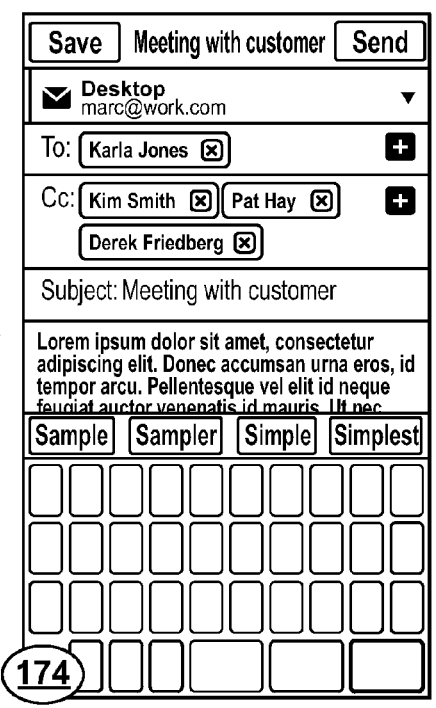

As another example, FIG. 9 shows an example of how block 425 can be implemented. In FIG. 9, four additional screens 170 are shown, in an example sequence that can be generated by graphical engine 140 in response to input. Screen 170-5 contemplates a screen-press 174 over the subject field bringing the cursor focus to the subject field. Screen 170-6 also shows a screen-press 174 on virtual keyboard 64 representing entering of the text "Meeting with cust" in the subject field 152. Screen 170-7 also shows a screen-press 174 on virtual keyboard 64 representing entering of the text into the composition field 156. Screen 170-8 also shows a screen-press 174 on virtual keyboard 64 and an instruction to hide the virtual keyboard so the full body of the message is visible.

It can be noted that screen 170-5 omits inclusion of a "Send" virtual button, but screen 170-6, screen 170-7, and screen 170-8 all include a "Send" Button. It will now be understood that the omission of the "Send" button in screen 170-5 leads to an automatic "no" determination at block 440. Likewise, a "no" determination is made on screen 170-6, screen 170-7, and screen 170-8 unless the "Send" button is actually depressed.

Figure 10:
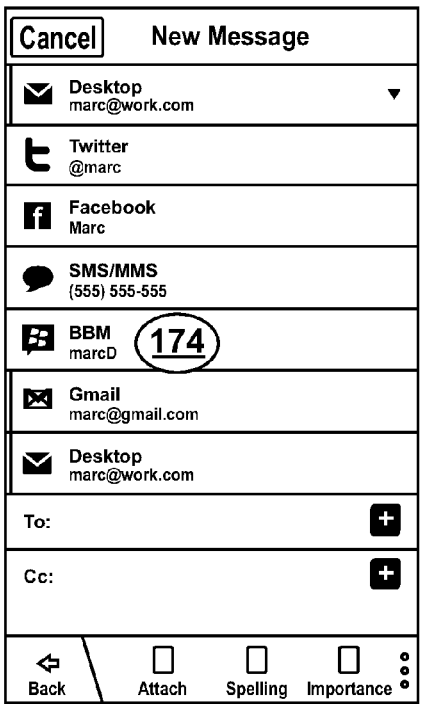
FIG. 10 is yet another plurality of screen captures showing yet another operation of a messaging composition interface.
Figure 10:
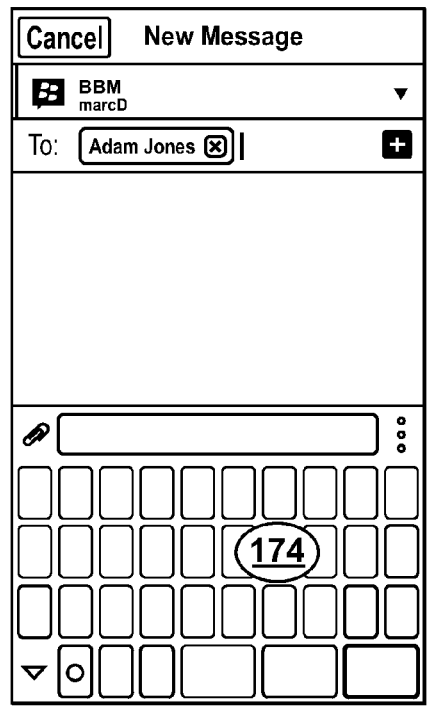
Figure 10:
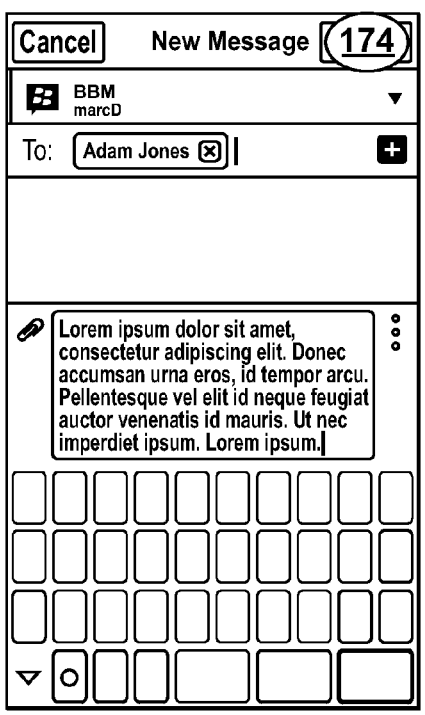
Figure 10:

As another example, FIG. 10 shows another example of how block 420, block 425, block 430 and block 422 can be implemented. In FIG. 10, four additional screens 170 are shown, in an example sequence that can be generated by graphical engine 140 in response to input. Screen 170-9 corresponds to block 420 and contemplates a screen-press 174 to select "BBM" as the message service, which in this case represents BlackBerry™ Messenger instant message service, but can also represent SMS, MMS or any other similar instant message or text message or chat service. Screen 170-10 corresponds to block 430 and contemplates the selection of "Adam Jones" as an addressee. Screen 170-11 corresponds to block 425 and contemplates the reception of content, and screen-press 174 on screen 170-11 represents pressing "Send" to thereby satisfy the "yes" condition at block 440 and leading to block 445 at which point the instant message is sent. Screen 170-12 represents modification of the MCI to a format consistent with instant message service to thereby show chat history and to show the dialogue between the sender and recipient. In other embodiments, screen 170-11 can include a history of previous message, such as a chat history, if the history is available for the addressee.

At this point it can be noted that the example in FIG. 10 also contemplates invocation of block 422 whereby the appearance of the MCI is modified to correspond with the type of selected messaging service. It can also be noted that in one implementation, the entire performance of the example in FIG. 10 is performed entirely within MCI application 124, but that in another implementation, screen 170-9, screen 170-10 and screen 170-11 can be performed within MCI application 124, but that screen 170-12 can be performed within BBM application 128-5, whereby an the BBM message application 128-5, and its corresponding graphical interface, is automatically invoked after or as part of block 445, such that the data received at block 420, block 425 and block 430 is passed through to the BBM message application 128-5 and thereafter BBM message application 128-5 is fully invoked and the graphical interface of BBM message application 128-5 is used thereafter for the remainder of the chat session.

Figure 11:
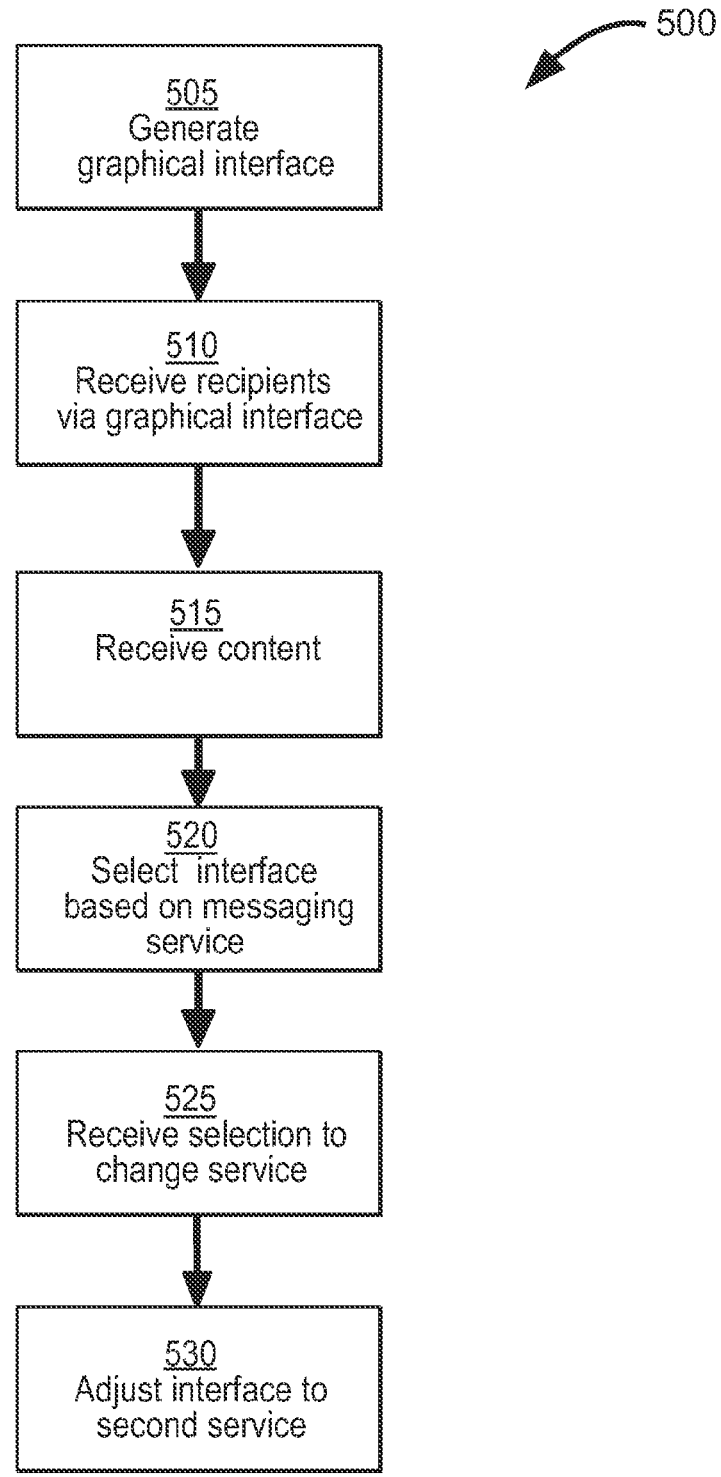
FIG. 11 is a flow chart of a method for adjusting the graphical interface in accordance with an embodiment.

Referring now to FIG. 11, a flowchart depicting a method for adjusting the graphical interface on an electronic device is indicated generally at 500. Method 500 is one way in which a MCI application 124 can change the graphical interface, such as in block 422. In addition, method 500 can also be used to provide data to the MCI such as the addressee data or content. It is to be emphasized, however, that method 500 can be performed on variations of device 50 and MCI application 124, and need not be performed in the exact sequence as shown, hence the elements of method 500 are referred to herein as "blocks" rather than "steps".

Block 505 comprises generating a graphical interface. In the present embodiment a graphical interface is generated on display 58. Graphical interfaces can be stored on non-volatile storage unit 104 and loaded depending on the messaging service selected.

Block 510 comprises receiving recipients via the graphical interface. In the present embodiment, the recipients are identified and correspond to the addressee. Block 515 comprises receiving content via the graphical interface.

Block 520 comprises selecting an interface based on the messaging service. For example, an SMS or BBM interface contemplates a chat interface with a composition frame, as well as a sent frame and a received frame. This chat set of screens allows for efficient rendering of a large number of short messages simulating a two-way conversation which is typical for these types of messaging services. For other services, such as email, one-way screens may be used. Furthermore, it is also contemplated that in some embodiments, the graphical interface for a service can be modified to adjust preferences associated with the graphical interface.

Block 525 comprises selecting a second service associated with a second graphical interface. Subsequently, block 530 comprises adjusting the graphical interface to conform with the selected messaging services from block 525.

While the foregoing provides certain non-limiting example embodiments, it should be understood that combinations, subsets, and variations of the foregoing are contemplated. For example, it is contemplated that method 400 can be modified to ultimately send the same content via multiple different message services according to message services that are actually available for a selected addressee. For example, if "Andrew" and "Dolly" are selected as addresses, but "Andrew" only has an email account, and "Dolly" only has a Facebook account, then method 400 can be modified to send content at block 445 to Andrew via email, and to Dolly via Facebook.

While specific embodiments have been described and illustrated, such embodiments should be considered illustrative only and should not serve to limit the accompanying claims.

What is claimed is:

1. A method for sending a message on an electronic device, the method comprising:
 establishing connections between a messaging composition interface and a plurality of individually executable messaging applications resident at the electronic device and corresponding to a plurality of messaging services, each of the plurality of messaging services having a communications type, and at least two of the plurality of messaging services having different communications types;

receiving, at the messaging composition interface, an input corresponding to a selection of a messaging service, the selection being made from a dynamically generated plurality of choices corresponding to the plurality of messaging services for which connections have been established, and adjusting the messaging composition interface to add or remove at least one field according to the communication type of the selected messaging service;

receiving content, at a messaging composition interface, wherein a message comprises the content and the message conforms to the communications type of the selected messaging service;

receiving input indicative of a destination for the message at the messaging composition interface, the input indicating a destination address conforming to the selected messaging service;

if, after receiving the input corresponding to the selection of the messaging service and the input indicative of the destination, receiving input corresponding to a selection of a different messaging service, then updating the destination address to correspond to the different messaging service when the destination is associated with an address conforming to the different message service;

sending the message to the destination via the selected one of the messaging service and the different messaging service; and automatically invoking, in response to sending the message, one of the plurality of individually executable messaging applications; and using a native graphical user interface of the invoked messaging application for the remainder of a messaging session.

2. The method of claim 1, wherein the messaging service is associated with an individually executable messaging application of the plurality of individually executable messaging applications.

3. The method of claim 1, wherein the different communications types include at least two of the following types: status updates, email, instant messages, and audio files.

4. The method of claim 1, wherein each of the individually executable messaging applications comprises its own native graphical interface.

5. The method of claim 1, further comprising, after receiving said content, selecting another message service.

6. The method of claim 5, wherein the content is preserved upon selecting said another message service.

7. The method of claim 1, wherein selecting a messaging service comprises determining a subset of available messaging services available to the destination.

8. The method of claim 7, further comprising rendering a menu comprising a plurality of selections corresponding to the subset of available messaging services.

9. The method of claim 1, wherein receiving input indicative of a destination comprises populating a recipient field of the messaging composition interface.

10. The method of claim 1, further comprising recommending a destination based on a portion of the input indicative of the destination.

11. An electronic device for sending a message, the electronic device comprising:
a network interface for communicating over a network;
an input device; and
a processor in communication with the network interface and the input device, the processor configured to:

establish connections between a messaging composition interface and a plurality of individually executable messaging applications resident at the electronic device and corresponding to a plurality of messaging services, each of the plurality of messaging services having a communications type, and at least two of the plurality of messaging services having different communications types;

receive, via the messaging composition interface, an input from the input device corresponding to a selection of a messaging service, the selection being made from a dynamically generated plurality of choices corresponding to the plurality of messaging services for which connections have been established, and adjust the messaging composition interface to add or remove at least one field according to the communication type of the selected messaging service;

receive content from the input device, via a messaging composition interface, wherein a message comprises the content and the message conforms to the communications type of the selected messaging service;

receive input indicative of a destination for the message, via the messaging composition interface, the input indicating a destination address conforming to the selected messaging service;

receive input corresponding to a selection of a different messaging service after receiving the input corresponding to the selection of the messaging service and the input indicative of the destination, and update the destination address to correspond to the different messaging service when the destination is associated with an address conforming to the different message service;

send the message to the destination via the selected one of the messaging service and the different messaging service through the network; and automatically invoke, in response to sending the message, one of the plurality of individually executable messaging applications; and use a native graphical user interface of the invoked messaging application for the remainder of a messaging session.

12. The electronic device of claim 11, wherein the messaging service is associated with an individually executable messaging application of the plurality of individually executable messaging applications.

13. The electronic device of claim 11, wherein each of the individually executable messaging applications comprises its own native graphical interface.

14. The electronic device of claim 11, wherein the processor is further configured to, after receiving said content, select another message service.

15. The electronic device of claim 14, wherein the content is preserved upon selecting said another message service.

16. The electronic device of claim 11, wherein the processor is further configured to determine a subset of available messaging services available to the destination.

17. The electronic device of claim 16, further comprising a display in communication with the processor, wherein the processor is further configured to render a menu comprising a plurality of selections corresponding to subset of available messaging services on the display.

18. The electronic device of claim 11, wherein the input device is configured to receive input for populating a recipient field of the messaging composition interface.

19. The electronic device of claim 11, wherein the input device is a touch membrane.

20. A non-transitory computer readable storage medium encoded with codes, the codes for directing a processor to:

establish connections between a messaging composition interface and a plurality of individually executable messaging applications resident at an electronic device and corresponding to a plurality of messaging services, each of the plurality of messaging services having a communications type, and at least two of the plurality of messaging services having different communications types;

receive, via the messaging composition interface, an input from an input device of the electronic device corresponding to a selection of a messaging service, the selection being made from a dynamically generated plurality of choices corresponding to the plurality of messaging services for which connections have been established, and adjusting the messaging composition interface to add or remove at least one field according to the communication type of the selected messaging service;

receive content, via a messaging composition interface, wherein a message comprises the content and the message conforms to the communications type of the selected messaging service;

receive input indicative of a destination for the message, via the messaging composition interface, the input indicating a destination address conforming to the selected messaging service;

receive input corresponding to a selection of a different messaging service after receiving the input corresponding to the selection of the messaging service and the input indicative of the destination, and update the destination address to correspond to the different messaging service when the destination is associated with an address conforming to the different message service;

send the message to the destination via the selected one of the messaging service and the different messaging service; and automatically invoke, in response to sending the message, one of the plurality of individually executable messaging applications; and use a native graphical user interface of the invoked messaging application for the remainder of a messaging session.

\* \* \* \* \*